United States Patent
Cai et al.

(10) Patent No.: US 11,120,572 B2
(45) Date of Patent: Sep. 14, 2021

(54) METHOD, SYSTEM AND APPARATUS FOR ASSOCIATING A TARGET OBJECT IN IMAGES

(71) Applicant: SENSETIME INTERNATIONAL PTE. LTD., Singapore (SG)

(72) Inventors: Zhongang Cai, Singapore (SG); Jinyi Wu, Singapore (SG); Haiyu Zhao, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/886,114

(22) Filed: May 28, 2020

(65) Prior Publication Data
US 2021/0192776 A1    Jun. 24, 2021

Related U.S. Application Data (63) Continuation of application No. PCT/IB2020/051580, filed on Feb. 25, 2020.

(30) Foreign Application Priority Data

Dec. 23, 2019 (SG) .......................... 10201913017T (51) Int. Cl.
*G06T 7/73* (2017.01)
*G06K 9/62* (2006.01)
(Continued)

(52) U.S. Cl.
CPC .............. *G06T 7/73* (2017.01); *G06K 9/6214* (2013.01); *G06T 7/543* (2017.01); *G06T 7/55* (2017.01)

(58) Field of Classification Search
None
See application file for complete search history.

(56) References Cited

U.S. PATENT DOCUMENTS

| 6,546,120 B1 | 4/2003 | Etoh et al. |
| 2012/0219185 A1* | 8/2012 | Hu .......................... G06K 9/32 |
| | | 382/103 |

FOREIGN PATENT DOCUMENTS

| CN | 103854301 A | 6/2014 |
| KR | 20080101998 A | 11/2008 |
| KR | 20160045098 A | 4/2016 |

OTHER PUBLICATIONS

W. Hu et al. ("Principal Axis-Based Correspondence between Multiple Cameras for People Tracking", IEEE Transactions on Pattern Analysis and Machine Intelligence, vol. 28, No. 4, Apr. 2006) (Year: 2006).*

(Continued)

*Primary Examiner* — Tahmina N Ansari (57) ABSTRACT

Image association methods, systems and apparatuses are provided. The method includes: obtaining a first image and a second image, where the first image is obtained by capturing a scene by a first image capture device at a first view, the second image is obtained by synchronously capturing the scene by a second image capture device at a second view, and the first view is different from the second view; determining an epipole of the first image capture device on a plane of the second image; determining a projection point of a first target point in a first bounding box on the second image, where the first bounding box is a bounding box of a target in the first image; and determining an association bounding box of the first bounding box in the second image according to the epipole and the projection point.

14 Claims, 6 Drawing Sheets

(51) Int. Cl.
*G06T 7/543* (2017.01)
*G06T 7/55* (2017.01)

(56) References Cited

OTHER PUBLICATIONS

Search Report and Written Opinion for Singapore Application No. 10201913017T, dated Jan. 28, 2020, 8 pages.
Hu et al., Principal axis-based correspondence between multiple cameras for people tracking. IEEE Transactions on pattern Analysis and Machine intelligence, Apr. 2006, vol. 28, No. 4, 9 pages.
International Search Report and Written Opinion for Application No. PCT/IB2020/051580, dated Sep. 14, 2020, 7 pages.
Korean Intellectual Property Office, Office Action Issued in Application No. 1020207023121, dated Dec. 7, 2020, 12 pages.
Decision of Rejection Issued in Korean Application No. 10-2020-7023121, dated Apr. 19, 2021, 9 pages.

* cited by examiner

METHOD, SYSTEM AND APPARATUS FOR ASSOCIATING A TARGET OBJECT IN IMAGES

CROSS-REFERENCE TO RELATED APPLICATION

The present application is a continuation of International Application No. PCT/IB2020/051580, filed on Feb. 25, 2020, which claims a priority of the Singaporean patent application No. 10201913017T filed on Dec. 23, 2019, all of which are incorporated herein by reference in their entirety.

TECHNICAL FIELD

The present disclosure relates to the field of computer vision technologies, and in particular, to an image association method, system and apparatus.

BACKGROUND

A system including a plurality of image capture devices (such as a multi-camera system) is very common in real life. Compared to a system only having a single image capture device, the system including a plurality of image capture devices has a wider field of view, can solve a blocking problem that cannot be solved by a single image capture device, and can obtain complete information of an object by fusing information of all image capture devices. However, the system including a plurality of image capture devices faces a problem of detection association, i.e., determining whether an object in an image captured by one image capture device and an object in an image captured by another image capture device are the same object in a physical space.

SUMMARY

Embodiments of the present disclosure provide an image association method, system and apparatus.

Specifically, the present disclosure is implemented by the following technical solutions.

According to a first aspect of the embodiments of the present disclosure, provided is an image association method, including:

obtaining a first image and a second image, where the first image is obtained by capturing a scene by a first image capture device at a first view, the second image is obtained by synchronously capturing the scene by a second image capture device at a second view, and the first view is different from the second view;

determining an epipole of the first image capture device on a plane of the second image, where the epipole represents a position of the first image capture device on the plane of the second image;

determining a projection point of a first target point in a first bounding box on the second image, where the first bounding box is a bounding box of a target in the first image; and determining an association bounding box of the first bounding box in the second image according to the epipole and the projection point, where a target in the association bounding box and the target in the first bounding box are the same target in the scene.

In some embodiments, a plurality of targets is included in the first image; determining the projection point of the first target point in the first bounding box on the second image includes:

determining first bounding boxes corresponding to the plurality of targets in the first image, where each of the first bounding boxes comprises a first target point; and determining the projection point of the first target point in each first bounding box on the second image sequentially according to a position of each first bounding box in the first image from bottom to top; and determining the association bounding box of the first bounding box in the second image according to the epipole and the projection point includes:

according to the position of each of the first bounding boxes in the first image from bottom to top, determining sequentially the association bounding box, in the second image, of the first bounding box corresponding to each of the projection point according to the epipole and the projection point.

In some embodiments, determining the epipole of the first image capture device on the plane of the second image includes:

determining the epipole of the first image capture device on the plane of the second image according to a predetermined fundamental matrix, where the fundamental matrix is a transformation matrix between a pixel coordinate system of the first image and a pixel coordinate system of the second image.

In some embodiments, determining the epipole of the first image capture device on the plane of the second image according to the predetermined fundamental matrix includes:

determining each of eigenvalues of the fundamental matrix and an eigenvector corresponding to each of the eigenvalues; and determining the epipole of the first image capture device on the plane of the second image according to the eigenvector corresponding to the minimum eigenvalue.

In some embodiments, determining the projection point of the first target point in the first bounding box on the second image includes:

determining the projection point of the first target point on the second image according to a predetermined homography matrix, where the homography matrix is a transformation matrix between a common plane in the first image and the common plane in the second image, and the common plane is a plane in which the first target point is located and which appears in a field of view of the second image capture device.

In some embodiments, determining the association bounding box of the first bounding box in the second image according to the epipole and the projection point includes:

for each of second bounding boxes in the second image, determining a perpendicular foot and a distance from a second target point in the second bounding box to a straight line determined by the epipole and the projection point, where the second bounding box is a bounding box of a target in the second image; and a relative position relationship between the second target point in the second bounding box and the second bounding box is identical with a relative position relationship between the first target point and the first bounding box in which the first target point is located;

determining the second bounding box of the second target point with the distance within a preset range and the perpendicular foot on a line segment determined by the epipole and the projection point, as a candidate bounding box;

placing the candidate bounding box into a candidate bounding box group; and determining the association bounding box of the first bounding box in the second image from the candidate bounding box group.

In some embodiments, determining the association bounding box of the first bounding box in the second image from the candidate bounding box group includes:

determining the candidate bounding box of the second target point with the next closest distance between the perpendicular foot and the projection point, as the association bounding box.

According to a second aspect of the embodiments of the present disclosure, provided is an image association apparatus, including:

a first obtaining module, configured to obtain a first image and a second image, where the first image is obtained by capturing a scene by a first image capture device at a first view, the second image is obtained by synchronously capturing the scene by a second image capture device at a second view, and the first view is different from the second view;

a first determination module, configured to determine an epipole of the first image capture device on a plane of the second image, where the epipole represents a position of the first image capture device on the plane of the second image;

a second determination module, configured to determine a projection point of a first target point in a first bounding box on the second image, where the first bounding box is a bounding box of a target in the first image; and an association module, configured to determine an association bounding box of the first bounding box in the second image according to the epipole and the projection point, where a target in the association bounding box and the target in the first bounding box are the same target in the scene.

In some embodiments, a plurality of targets is included in the first image; the second determination module is configured to:

determine first bounding boxes corresponding to the plurality of targets in the first image, where each of the first bounding boxes comprises a first target point; and determine the projection point of the first target point in each of the first bounding boxes on the second image sequentially according to a position of each of the first bounding boxes in the first image from bottom to top; and the association module is configured to:

according to the position of each of the first bounding boxes in the first image from bottom to top, determine sequentially the association bounding box, in the second image, of the first bounding box corresponding to each of the projection points according to the epipole and the projection point.

In some embodiments, the first determination module is configured to:

determine the epipole of the first image capture device on the plane of the second image according to a predetermined fundamental matrix, where the fundamental matrix is a transformation matrix between a pixel coordinate system of the first image and a pixel coordinate system of the second image.

In some embodiments, the first determination module includes:

a first determination unit, configured to determine each of eigenvalues of the fundamental matrix and a eigenvector corresponding to each of the eigenvalues; and a second determination unit, configured to determine the epipole of the first image capture device on the plane of the second image according to the eigenvector corresponding to the minimum eigenvalue.

In some embodiments, the second determination module is configured to:

determine the projection point of the first target point on the second image according to a predetermined homography matrix, where the homography matrix is a transformation matrix between a common plane in the first image and the common plane in the second image, and the common plane is a plane in which the first target point is located and which appear in a field of view of the second image capture device.

In some embodiments, the association module includes:

a third determination unit, configured to for each of second bounding boxes in the second image, determine a perpendicular foot and a distance from a second target point in the second bounding box to a straight line determined by the epipole and the projection point, where the second bounding box is a bounding box of a target in the second image; and a relative position relationship between the second target point in the second bounding box and the second bounding box is identical with a relative position relationship between the first target point and the first bounding box in which the first target point is located;

a fourth determination unit, configured to determine the second bounding box of the second target point with the distance within a preset range and the perpendicular foot on a line segment determined by the epipole and the projection point, as a candidate bounding box and place the candidate bounding box into a candidate bounding box group; and an association unit, configured to determine the association bounding box of the first bounding box in the second image from the candidate bounding box group.

In some embodiments, the association unit is configured to:

determine the candidate bounding box of the second target point with the next closest distance between the perpendicular foot and the projection point, as the association bounding box.

According to a third aspect of the embodiments of the present disclosure, provided is an image association system, including:

a first image capture device, configured to obtain a first image by capturing a scene at a first view;

a second image capture device, configured to obtain a second image by synchronously capturing the scene at a second view, where the first view is different from the second view; and a processor, configured to obtain the first image and the second image; determine an epipole of the first image capture device on a plane of the second image, where the epipole represents a position of the first image capture device on the plane of the second image; determine a projection point of a first target point in a first bounding box on the second image, where the first bounding box is a bounding box of a target in the first image; and determine an association bounding box of the first bounding box in the second image according to the epipole and the projection point, where a target in the association bounding box and the target in the first bounding box are the same target in the scene.

According to a fourth aspect of the embodiments of the present disclosure, provided is a computer readable storage medium having a computer program stored thereon, where when the program is executed by a processor, the method according to any one of the embodiments is implemented.

According to a fifth aspect of the embodiments of the present disclosure, provided is a computer device, including a memory, a processor, and a computer program stored on the memory and capable of running on the processor, where when the processor executes the program, the method according to any one of the embodiments is implemented.

According to the embodiments of the present disclosure, a first image captured by a first image capture device and a second image captured by a second image capture device are obtained, where the first image is obtained by capturing a scene by the first image capture device at a first view, the second image is obtained by synchronously capturing the scene by the second image capture device at a second view, and the first view is different from the second view; an epipole of the first image capture device on a plane of the second image is determined, where the epipole represents a position of the first image capture device on the plane of the second image; a projection point of a first target point in a first bounding box on the second image is determined, where the first bounding box is a bounding box of a target in the first image; and an association bounding box of the first bounding box in the second image is determined according to the epipole and the projection point, where a target in the association bounding box and the target in the first bounding box are the same target in the scene. With respect to a traditional Three-Dimensional (3D) association algorithm, the method avoids estimating a distance by using a monocular depth estimation algorithm, thereby avoiding an inaccurate association caused by an inaccurate distance estimation, and further improving the reliability and accuracy of image association. Furthermore, the method is applicable to different systems including a plurality of image capture devices, and has a wide application range.

It should be understood that the above general description and the following detailed description are merely exemplary and explanatory, and are not intended to limit the present disclosure.

BRIEF DESCRIPTION OF THE DRAWINGS

The accompanying drawings here incorporated in the specification and constituting a part of the specification describe the embodiments of the present disclosure and are intended to explain the technical solutions of the present disclosure together with the specification.

DETAILED DESCRIPTION OF THE EMBODIMENTS

Herein, the exemplary embodiments are described in detail, and the examples thereof are shown in the accompanying drawings. When the descriptions below relate to the accompanying drawings, unless otherwise stated, same numbers in different accompanying drawings indicate a same or similar element. The embodiments described in the following exemplary embodiments do not represent all embodiments consistent with the present application. In contrary, said embodiments are merely examples of apparatuses and methods that are consistent with the detailed descriptions in the appended claims and some aspects of the present application.

Terms used in the present application are merely intended for describing particular embodiments other than limiting the present application. The singular forms "a", "said", and "the" used in the present application and the appended claims are also intended to include the plural forms, unless expressly stated otherwise. It shall be further understood that the term "and/or" used herein refers to and includes any combination or all possible combinations of one or more associated listed items. In addition, the term "at least one" used herein represents any one of multiple elements or any combination of at least two of the multiple elements.

It shall be understood that although the present application may use the terms such as first, second, and third to describe different information, but the information shall not be limited to these terms. These terms are only used for distinguishing the same type of information. For example, first information can also be called second information without departing from the scope of the present application, and similarly, the second information can also be called the first information. Depending on the context, for example, the word "if" used herein can be interpreted as "upon" or "when" or "in response to determining".

In order to make a person skilled in the art better understand the technical solutions in the embodiments of the present disclosure, and make the purposes, features, and advantages of the embodiments of the present disclosure more apparent and more readily understandable, the technical solutions in the embodiments of the present disclosure are further described in detail below with reference to the accompanying drawings.

Figure 1:
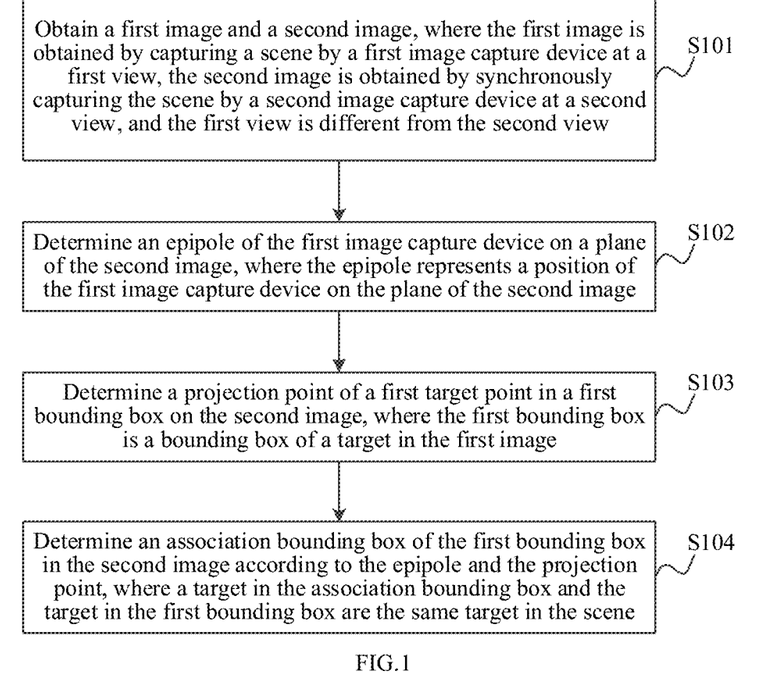
FIG. 1 is a flowchart of an image association method according to an embodiment of the present disclosure.

As shown in FIG. 1, the present disclosure provides an image association method, including the following steps.

At step S101, a first image and a second image are obtained, where the first image is obtained by capturing a scene by a first image capture device at a first view, the second image is obtained by synchronously capturing the scene by a second image capture device at a second view, and the first view is different from the second view.

At step S102, an epipole of the first image capture device on a plane of the second image is determined, where the epipole represents a position of the first image capture device on the plane of the second image.

At step S103, a projection point of a first target point in a first bounding box on the second image is determined, where the first bounding box is a bounding box of a target in the first image.

At step S104, an association bounding box of the first bounding box in the second image is determined according to the epipole and the projection point, where a target in the association bounding box and the target in the first bounding box are the same target in the scene.

Figure 2:
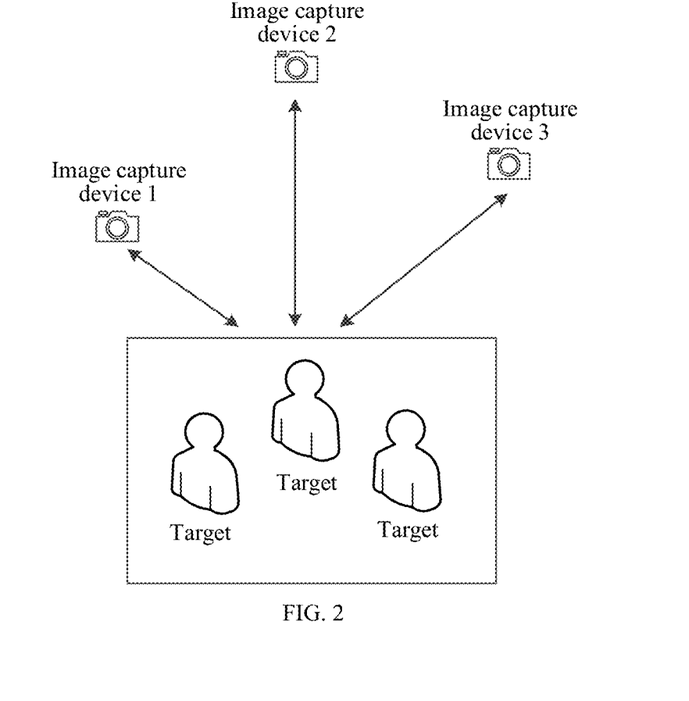
FIG. 2 is a schematic diagram of a system including a plurality of image capture devices according to an embodiment of the present disclosure.

The embodiments of the present disclosure can be used for a system including a plurality of image capture devices, where the image capture device may be a camera, a webcam and the like. The system including a plurality of image capture devices according to an embodiment is as shown in FIG. 2. FIG. 2 shows a system including three image capture devices. It can be understood that the embodiment is only used for giving an example. In actual application, the number of the image capture devices may be two, and may also be greater than two, and no limitation is made thereto in the present disclosure. In the system including a plurality of image capture devices, each image capture devices can capture an image within a certain area, and one or more targets may be included in the captured image, where the target may include, but is not limited to, a person, an animal, an object, or a space and the like. Association processing needs to be performed on the images captured by the image capture devices, so as to determine whether the targets in the images are the same target in a physical space. For example, an image captured by an image capture device 2 in FIG. 2 includes two targets, an image captured by an image capture device 1 includes one target, and an image captured by an image capture device 3 also includes one target. Therefore, it is necessary to associate the images captured by the three image capture devices, so as to determine whether the target in the image captured by the image capture device 1 is one of the targets in the image captured by the image capture device 2, and determine whether the target in the image captured by the image capture device 3 is one of the targets in the image captured by the image capture device 2.

For ease of description, when an association bounding box associated with a bounding box in an image is searched, the image is called a first image, and an image capture device capturing the first image is called a first image capture device, where the bounding box is in the first image; and when an image is searched for an association bounding box associated with a bounding box, the image is called a second image, and an image capture device capturing the second image is called a second image capture device, where the association bounding box is in the second image. Still taking the system including a plurality of capture devices shown in FIG. 2 as an example, it is assumed that the association bounding boxes associated with the bounding boxes of the targets in the image captured by the image capture device 2 needs to be searched, the image captured by the image capture device 2 is called the first image, and the image capture device 2 is called the first image capture device; if the association bounding box is determined from the image captured by the image capture device 1 and the image captured by the image capture device 3, the image captured by the image capture device 1 and the image captured by the image capture device 3 are both called the second image, and the image capture device 1 and the image capture device 3 are both called the second image capture device.

In actual application, the number of the image capture devices for capturing the images at different views (such as, top view, left view, right view and so on) in the same scene is not limited to two, for example, multiple. When the number of the image capture devices is multiple, the targets between every two images in the captured plurality of images can be associated by using the image association method provided in the embodiments of the present disclosure, so that an association relationship among the targets in the plurality of images is determined. For ease of description, a case that the number of the first image capture devices and the number of the second image capture devices are both one is described as follows. When the number of the image capture devices is greater than two, details about an association method of the targets in the images captured by the image capture devices are not described herein again.

At step S101, when the system includes the first image capture device and the second image capture device, the images are synchronously captured by the first image capture device and the second image capture device at different views. For example, the first image capture device may capture a top view image in an area, and the second image capture device may synchronously capture a side view image in the area (for example, a left view image, a right view image and the like). The image may be an image frame in a video, and may also be a picture captured by the image capture device. The first image and the second image in the embodiments of the present disclosure are synchronously captured by the first image capture device and the second image capture device, respectively. That is to say, it is assumed that the first image is an image at a moment T in the scene, the second image is also the image at the moment T in the scene.

At step S102, the epipole of the first image capture device on the plane of the second image can be determined according to a fundamental matrix between the first image capture device and the second image capture device. The fundamental matrix is a transformation matrix between a pixel coordinate system of the first image and a pixel coordinate system of the second image. The fundamental matrix can be predetermined, and is not changed as long as a relative position between the first image capture device and the second image capture device does not change. Specifically, each eigenvalue of the fundamental matrix and an eigenvector corresponding to each eigenvalue can be determined, and the epipole of the first image capture device on the plane of the second image is determined according to the eigenvector corresponding to the minimum eigenvalue. The epipole of the first image capture device on the plane of the second image may be used to represent a position of the first image capture device in the field of view of the second image capture device. It is noted that the first image capture device may be beyond the field of view of the second image capture device.

Multiple groups of corresponding pixel points in the first image and the second image are obtained, and then the fundamental matrix between the first image capture device and the second image capture device is calculated according to the multiple groups of corresponding pixel points, where for each group of corresponding pixel points, the group of corresponding pixel points corresponds to a same physical point in the physical space. When parts of fields of view of the two image capture devices are overlapped, the pixel points in the images captured by the two image capture devices may have a corresponding relationship in the real world. For example, there is an ink point on a table, the pixel points respectively formed by the ink point in the first image and the second image have a corresponding relationship.

Figure 3:
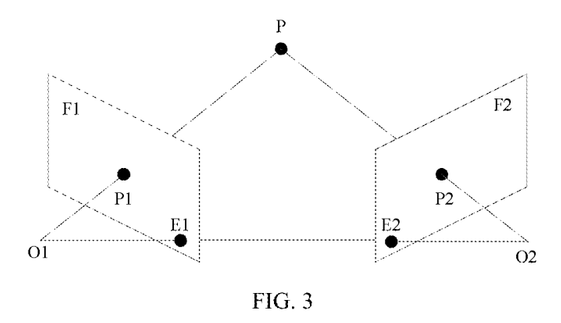
FIG. 3 is a schematic diagram of corresponding pixel points in images of different image capture devices according to an embodiment of the present disclosure.

FIG. 3 shows a schematic diagram of corresponding pixel points in images captured by different image capture devices according to an embodiment of the present disclosure. F1 and F2 respectively represent a first image and a second image; P represents a point in a physical space; P1 and P2 respectively represent corresponding pixel points of the point P in the first image and the second image, i.e., a group of corresponding pixel points in the first image and the second image. O1 and O2 respectively represent optical centers of the first image capture device and the second image capture device; E1 and E2 respectively represent intersections of a connection line between O1 and O2 with the first image and the second image, i.e., E1 represents an epipole of the second image capture device on the plane of the first image, and E2 represents an epipole of the first image capture device on the plane of the second image. By obtaining multiple groups of corresponding pixel points, the fundamental matrix between the first image capture device and the second image capture device is calculated according to the multiple groups of corresponding pixel points, and then, the epipole E2 of the first image capture device on the plane of the second image is determined according to the fundamental matrix.

Figure 4:
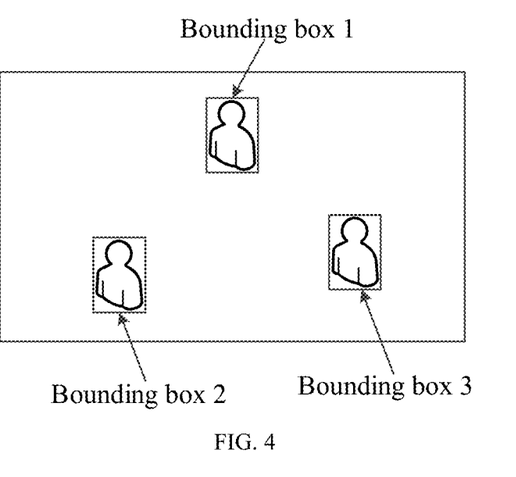
FIG. 4 is a schematic diagram of bounding boxes in an image according to an embodiment of the present disclosure.

At step S103, the bounding box refers to a rectangular box generated for a target in the image, where the target is located in the bounding box, and a pixel position of each bounding box in the image and the size of the bounding box are known (generally, a pixel coordinate at the upper left corner of each bounding box and the length and width of the bounding box are provided). Therefore, the pixel position of the target in the image can be determined by the bounding box. One or more targets may be included in an image, there is a bounding box for each target, and the bounding boxes are distributed on different positions of the image. FIG. 4 shows a schematic diagram of bounding boxes in an image according to an embodiment of the present disclosure. Three bounding boxes are shown in FIG. 4. When there are multiple bounding boxes, association bounding boxes of the bounding boxes can be respectively determined for the bounding boxes. Regarding the bounding boxes in FIG. 4, an association bounding box associated with a bounding box 1, an association bounding box associated with a bounding box 2, and an association bounding box associated with a bounding box 3 can be respectively determined.

In an embodiment, a plurality of targets is included in a first image. First bounding boxes corresponding to the plurality of targets in the first image is determined, where each of the first bounding boxes includes a first target point. A projection point of a first target point in each first bounding box on a second image can be determined sequentially according to a position of each first bounding box in the first image from bottom to top. According to the position of each first bounding box in the first image from bottom to top, an association bounding box of the first bounding box corresponding to each projection point on the second image is determined sequentially according to the epipole and the projection point. The "top" and the "bottom" herein mean a relative position relationship in the first image, where the "bottom" refers to an image area having a larger vertical coordinate in the pixel coordinates, and the "top" refers to an image area having a smaller vertical coordinate in the pixel coordinates.

Figure 5:
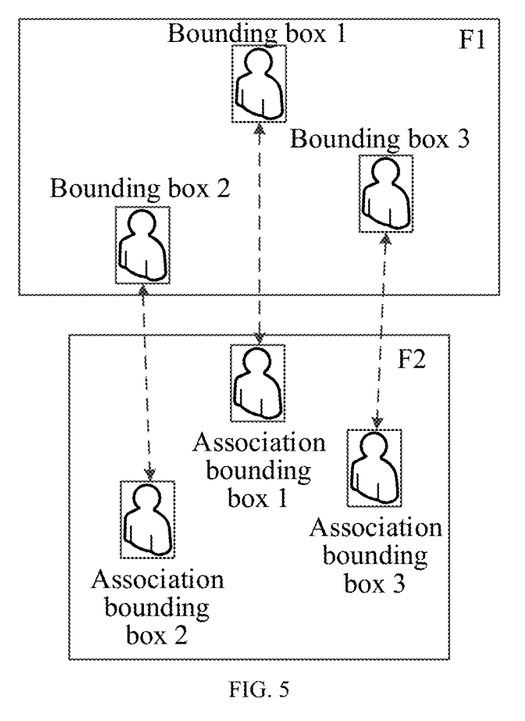
FIG. 5 is a schematic diagram for determining association bounding boxes according to an embodiment of the present disclosure.

FIG. 5 shows a schematic diagram for determining association bounding boxes for bounding boxes in an image shown in FIG. 4. Because positions of a bounding box 2, a bounding box 3 and a bounding box 1 in a first image F1 are from bottom to top, when association bounding boxes are determined in a second image F2, a projection point A2 of a first target point in the bounding box 2 on the second image, a projection point A3 of the first target point in the bounding box 3 on the second image, and a projection point A1 of the first target point in the bounding box 1 on the second image are determined sequentially. An association bounding box (i.e., an association bounding box 2) of the bounding box 2 on the second image is determined according to the epipole and A2; then, an association bounding box (i.e., an association bounding box 3) of the bounding box 3 on the second image is determined according to the epipole and A3; and an association bounding box (i.e., an association bounding box 1) of the bounding box 1 on the second image is determined according to the epipole and A1, where the first target point in the first bounding box may be a central point of the first bounding box, and may also be any point in the first bounding box.

Generally, the target closer to the bottom in the first image is the target closer to the first image capture device. If matching of the association bounding box is performed first starting from a first bounding box on the top of the first image, more association bounding boxes may be obtained in the second image, and thus, on one hand, it would be easier to cause a mismatch, and on the other hand, the matching complexity is also increased. If matching of the association bounding box is performed first from bottom to top, a fewer or even only one association bounding box for the first bounding box on the bottom of the first image is obtained in the second image. After the matching of the first bounding box on the bottom is completed, the association bounding box of the first bounding box on the bottom can be excluded during matching of the first bounding box on the top, so that the number of possible association bounding boxes is reduced, the accuracy of matching is improved, and the matching complexity is reduced.

Figure 6:
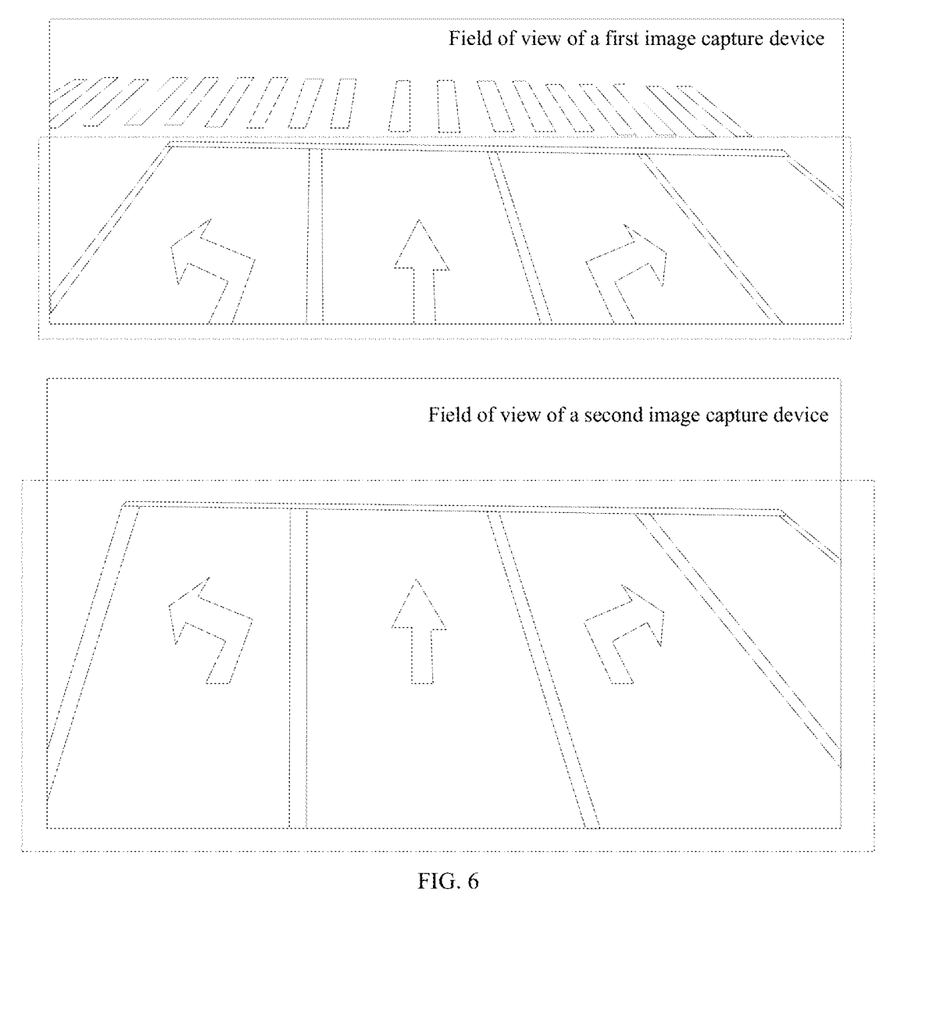
FIG. 6 is a schematic diagram of a common plane according to an embodiment of the present disclosure.

The projection point of the first target point of the first bounding box on the second image is a corresponding point of the first target point on a common plane within the field of view of the second image capture device. When the first target point is on a plane, if the plane also appears in the field of view of the second image capture device, the plane is called the common plane. Generally, it is assumed that the first image capture device and the second image capture device are both above the plane, and the plane simultaneously appears in the fields of view of the first image capture device and the second image capture device, the plane is the common plane. The common plane may be a plane such as a tabletop or a road surface. FIG. 6 shows a common plane according to an embodiment, and the common plane is a road surface in a dashed box. Because the road surface simultaneously appears in the fields of view of the first image capture device and the second image capture device, the road surface is the common plane.

In an embodiment, the projection point of the first target point of the first bounding box on the second image can be determined according to a homography matrix between the first image capture device and the second image capture device, where the first target point may be the central point of the first bounding box. For each first bounding box that needs to be matched, the central point of the first bounding box is obtained as the first target point. Assuming that the central point appears on the common plane, the central point is projected to a pixel point in the common plane in the field of view of the second image capture device by using the homography matrix, and the pixel point is marked as the projection point. The homography matrix may be pre-calculated by multiple groups of pixel points on the first image and the second image. However, it is required that all physical points corresponding to the pixel points for calculating the homography matrix are located on the common plane.

At step S104, the association bounding box of the first bounding box in the second image can be determined according to the epipole and the projection point.

Specifically, a perpendicular foot and a distance from a second target point in each second bounding box to a straight line determined by the epipole and the projection point can be determined, where the second bounding box is a bounding box of a target in the second image; a relative position relationship between the second target point in the second bounding box and the second bounding box is identical with a relative position relationship between the first target point and the first bounding box where the first target point is located; the second bounding box of the second target point with the distance within a preset range and the perpendicular foot on a line segment determined by the epipole and the projection point, is determined as a candidate bounding box; the candidate bounding box is placed into a candidate bounding box group; and the association bounding box of the first bounding box in the second image is determined from the candidate bounding box group.

Figure 7:
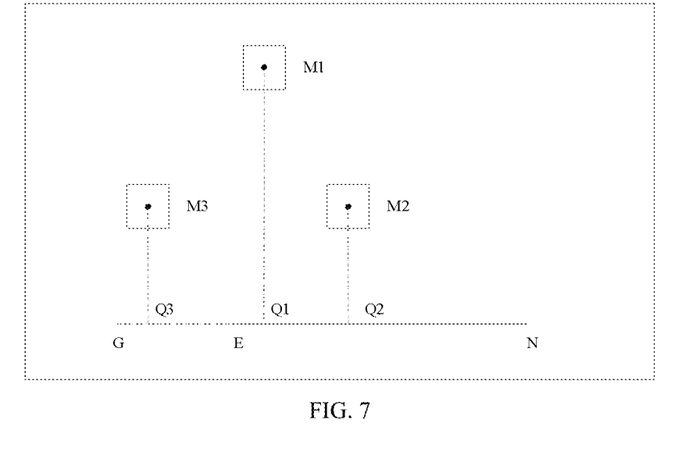
FIG. 7 is a schematic diagram for determining a candidate bounding box according to an embodiment of the present disclosure.

A schematic diagram for determining a candidate bounding box according to an embodiment of the present disclosure is as shown in FIG. 7, where E represents an epipole; N represents a projection point; line segment EG represents an extension line of a line segment EN; M1, M2, and M3 respectively represent second target points of three second bounding boxes in a second image; Q1, Q2, and Q3 respectively represent perpendicular foots of M1, M2 and M3 on the line segment EN. It is assumed that the distances from M2 and M3 to a straight line GN are within a preset range, and the distance from M1 to the straight line GN is beyond the preset range. Because Q3 is not on the line segment EN, but is on the extension line of the line segment EN, and meanwhile, only M2 satisfies that the distance is within the preset range and the perpendicular foot is on the line segment determined by the epipole and the projection point, a bounding box corresponding to M2 is determined as the candidate bounding box.

Figure 8:
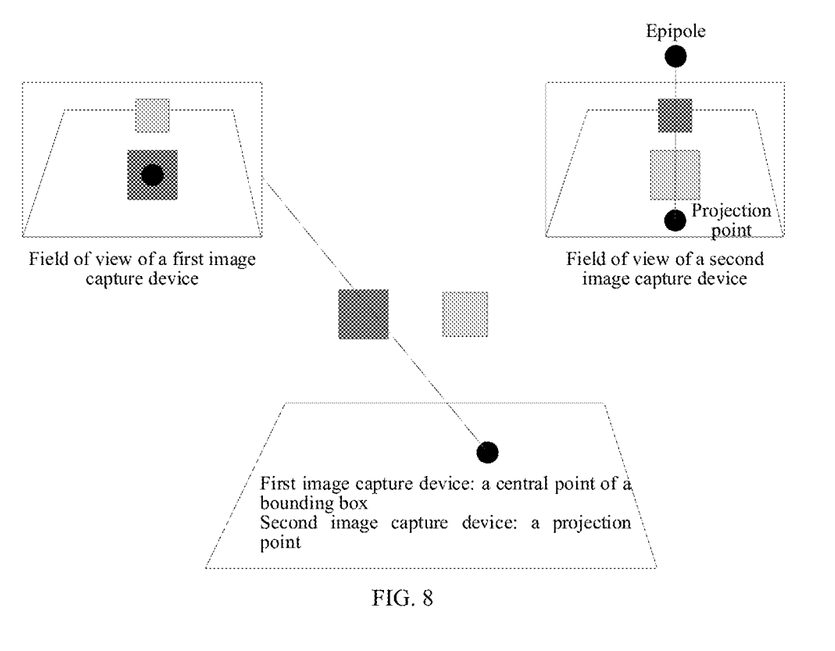
FIG. 8 is a schematic diagram for determining an association bounding box according to an embodiment of the present disclosure.

If the number of candidate bounding boxes in the candidate bounding box group is greater than one, the candidate bounding box of the second target point with the next closest distance between the perpendicular foot and the projection point, is determined as the association bounding box. FIG. 8 shows a schematic diagram for determining an association bounding box according to an embodiment of the present disclosure, where a rectangle at the upper left corner represents the field of view of a first image capture device; a rectangle at the upper right corner represents the field of view of a second image capture device; a trapezoid below represents a common plane; a point on a common plane corresponds to a central point of a bounding box in a first image captured by the first image capture device, and corresponds to a projection point of the central point in an second image captured by the second image capture device; a trapezoid at the upper left corner represents the common plane within the field of view of the first image capture device, and a trapezoid at the upper right corner represents the common plane within the field of view of the second image capture device.

When an association bounding box of a dark-colored bounding box of the first image in the second image is obtained, if two bounding boxes, as shown in FIG. 8, exist in the second image, a bounding box corresponding to the second target point of which the perpendicular foot is far away from the projection point in the second image (i.e., a dark-colored bounding box in the second image) is used as the association bounding box of the dark-colored bounding box in the first image. If the bounding box (a light-colored bounding box) corresponding to the second target point of which the perpendicular foot is closest to the projection point is selected, a mismatch would occur.

In a Two-Dimensional (2D) plane-based association mode, it is assumed that the targets all appear on a plane (such as tabletop or road surface), an object in an image captured by of an image capture device is projected to another image captured by the other image capture device by the homography matrix, and then matching is performed by using a bipartite graph matching algorithm having minimum loss (Kuhn-Munkres algorithm). However, the Kuhn-Munkres algorithm can only be applicable to association of objects on the plane, and the application is limited because not all objects in all scenes are on a common 2D plane. In addition, if an imaging plane of the image capture device is not parallel to the 2D plane, same pixel distances correspond to different real distances at different positions of the image, rendering that the bipartite graph matching algorithm having minimum loss is influenced, and even is completely unavailable in extreme situations. When two planes are not parallel, only one edge of the bounding box is in contact with the common 2D plane, but the central point of the edge is not the center of the object. Therefore, even if various noises are not considered, projections of bounding boxes in multiple image capture devices are not completely overlapped, rendering that a mismatch occurs when objects are dense.

Compared with the 2D space-based association mode, an 3D space-based association mode is more complex. Because the image capture device does not have depth distance information of the target (i.e., a far large object and a near small object may have the same image), it is necessary to estimate the depth distance by first using a depth estimation algorithm (for example, a monocular image capture device may use known size information of the object). Then, bipartite graph matching having minimum loss is performed on the target in the 3D space. A problem of an association algorithm based on the 3D space is that a monocular vision depth estimation algorithm can only perform estimation by the size of the bounding box without a depth learning model. Two problems exist herein: one is that the bounding box is not always perfect, and therefore cannot completely wrap the object, i.e., the size of the bounding box cannot represent the size of the object; and the other one is that the true size of the object is often unknown, and although an accurate type of the object is detected, the size of the object of the type may also be greatly different. Therefore, the robustness of depth estimation is not good, thereby directly influencing the accuracy of subsequent operation of the matching algorithm.

The solution of 2.5D-based association method provided in the present disclosure combines the advantages of 2D-based association mode and 3D-based association mode, avoids the disadvantages of 2D-based association mode and 3D-based association mode, and implements the matching of the bounding boxes in the 3D space based on the 2D plane in the scene. According to the embodiments of the present disclosure, on the basis of an epipolar geometry in computer vision, the position of the first image capture device on a plane of the second image captured by the second image capture device is calculated, and the position of a point, which is assumed on the plane, in the bounding box of the first image capture device and projected to the plane of the second image capture device are calculated, so as to search for a possible corresponding association bounding box in the second image, thereby completing matching. The technical solutions of the embodiments of the present disclosure can implement association of the bounding boxes of the objects in the 3D space. Furthermore, compared with the traditional 3D association algorithm, the present disclosure does not need to use a depth distance estimation algorithm, improves the reliability and accuracy of image association, is applicable to various systems including a plurality of capture devices, and has a wide application range.

A person skilled in the art can understand that, in the foregoing methods of the detailed description, the order in which the steps are written does not imply a strict execution order which constitutes any limitation to the implementation process, and the specific order of executing the steps should be determined by functions and possible internal logics thereof.

Figure 9:
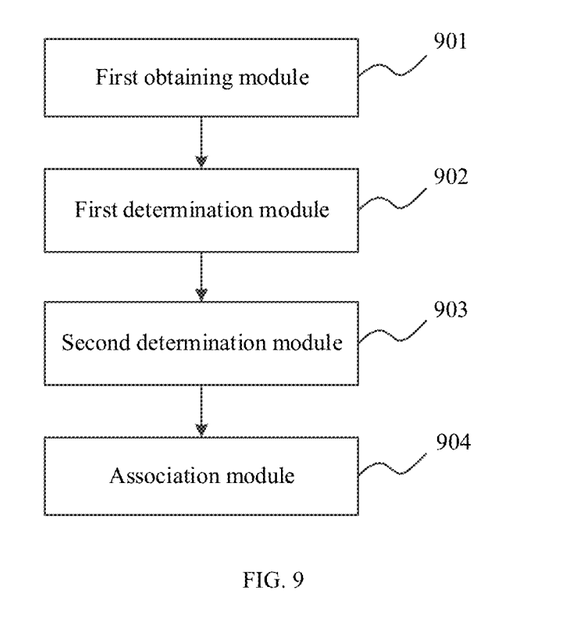
FIG. 9 is a block diagram of an image association apparatus according to an embodiment of the present disclosure.

As shown in FIG. 9, the present disclosure further provides an image association apparatus, including:

a first obtaining module 901, configured to obtain a first image and a second image, where the first image is obtained by capturing a scene by a first image capture device at a first view, the second image is obtained by synchronously capturing the scene by a second image capture device at a second view, and the first view is different from the second view;

a first determination module 902, configured to determine an epipole of the first image capture device on a plane of the second image, where the epipole represents a position of the first image capture device on the plane of the second image;

a second determination module 903, configured to determine a projection point of a first target point in a first bounding box on the second image, where the first bounding box is a bounding box of a target in the first image; and an association module 904, configured to determine an association bounding box of the first bounding box in the second image according to the epipole and the projection point, where a target in the association bounding box and the target in the first bounding box are the same target in the scene.

In some embodiments, a plurality of targets is included in the first image; the second determination module is configured to:

determine first bounding boxes corresponding to the plurality of targets in the first image, wherein each of the first bounding boxes comprises a first target point; and determine the projection point of the first target point in each of the first bounding boxes on the second image sequentially according to a position of each of the first bounding boxes in the first image from bottom to top; and the association module is configured to:

according to the position of each of the first bounding boxes in the first image from bottom to top, determine sequentially the association bounding box, in the second image, of the first bounding box corresponding to each of the projection points according to the epipole and the projection point.

In some embodiments, the first determination module is configured to:

determine the epipole of the first image capture device on the plane of the second image according to a predetermined fundamental matrix, where the fundamental matrix is a transformation matrix between a pixel coordinate system of the first image and a pixel coordinate system of the second image.

In some embodiments, the first determination module includes:

a first determination unit, configured to determine each of eigenvalues of the fundamental matrix and an eigenvector corresponding to each of the eigenvalues; and a second determination unit, configured to determine the epipole of the first image capture device on the plane of the second image according to the eigenvector corresponding to the minimum eigenvalue.

In some embodiments, the second determination module is configured to:

determine the projection point of the first target point on the second image according to a predetermined homography matrix, wherein the homography matrix is a transformation matrix between a common plane in the first image and the common plane in the second image, and the common plane is a plane in which the first target point is located and which appear in a field of view of the second image capture device.

In some embodiments, the association module includes:

a third determination unit, configured to: for each of second bounding boxes in the second image, determine a perpendicular foot and a distance from a second target point in the second bounding box to a straight line determined by the epipole and the projection point, wherein the second bounding box is a bounding box of a target in the second image; and a relative position relationship between the second target point in the second bounding box and the second bounding box is identical with a relative position relationship between the first target point and the first bounding box in which the first target point is located;

a fourth determination unit, configured to determine the second bounding box of the second target point with the distance within a preset range and the perpendicular foot on a line segment determined by the epipole and the projection point, as a candidate bounding box and place the candidate bounding box into a candidate bounding box group; and an association unit, configured to determine the association bounding box of the first bounding box in the second image from the candidate bounding box group.

In some embodiments, the association unit is configured to:

determine the candidate bounding box of the second target point with the next closest distance between the perpendicular foot and the projection point, as the association bounding box.

In some embodiments, the functions or the modules included in the apparatuses provided by the embodiments of the present disclosure may be used to implement the methods described in the foregoing method embodiments. For specific implementations, reference may be made to the description in the method embodiments above. For the purpose of brevity, details are not described herein again.

The embodiments of the present disclosure further provide an image association system, including:

a first image capture device, configured to obtain a first image by capturing a scene at a first view;

a second image capture device, configured to obtain a second image by synchronously capturing the scene at a second view, where the first view is different from the second view; and a processor, configured to obtain the first image and the second image; determine an epipole of the first image capture device on a plane of the second image, where the epipole represents a position of the first image capture device on the plane of the second image; determine a projection point of a first target point in a first bounding box on the second image, where the first bounding box is a bounding box of a target in the first image; and determine an association bounding box of the first bounding box in the second image according to the epipole and the projection point, where a target in the association bounding box and the target in the first bounding box are the same target in the scene.

In the image association system, for how the first image capture device and the second image capture device capture the image, and how the processor associates the bounding boxes of the targets in the first image and the bounding boxes of the targets in the second image, reference may be made to the description in the method embodiments above. For the purpose of brevity, details are not described herein again.

The foregoing described apparatus embodiments are merely schematic. The modules described as separate parts may or may not be physically separate, and the parts displayed as modules may or may not be physical modules, may be located at one position, or may be distributed on a plurality of network modules. Some or all of the modules may be selected to achieve the objectives of the solutions of the specification according to actual needs. A person of ordinary skill in the art can understand and implement the embodiments without creative efforts.

Figure 10:
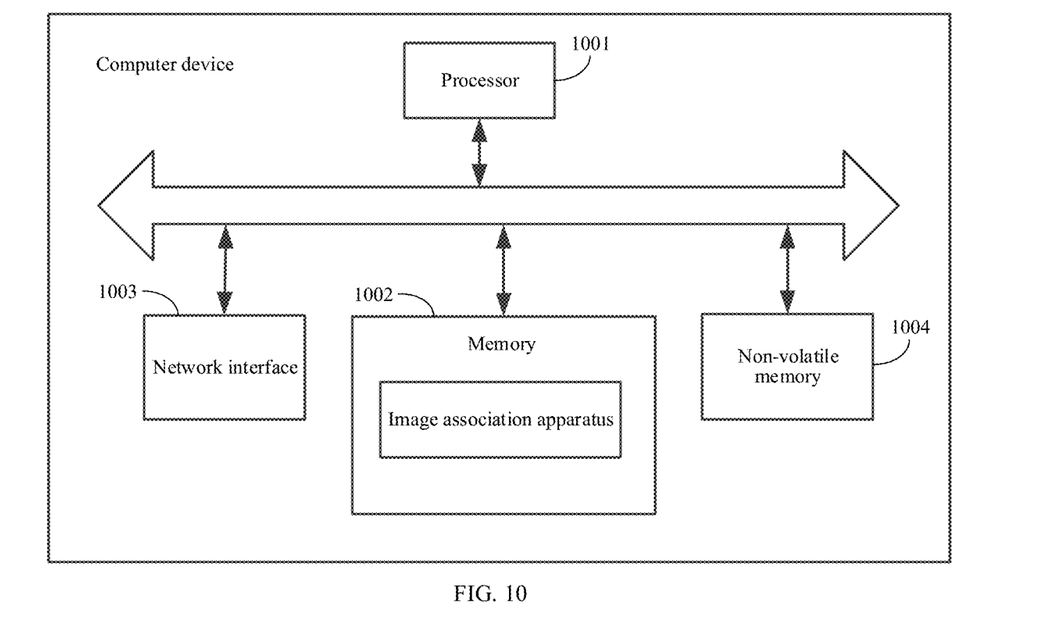
FIG. 10 is a schematic diagram of a computer device for implementing a method of the present disclosure according to an embodiment of the present disclosure.

The apparatus embodiments of the specification can be applied to computer devices, such as servers or terminal devices. The apparatus embodiments can be implemented by software, and can also be implemented by hardware or a combination of software and hardware. Taking software implementation as an example, as an apparatus in a logical sense, it is formed by reading corresponding computer program instructions in a non-volatile memory into a memory. For hardware, FIG. 10 shows a hardware schematic diagram of a computer device in which the apparatus is located according to the specification. In addition to a processor 1001, a memory 1002, a network interface 1003, and a non-volatile memory 1004 shown in FIG. 10, the server or electronic device in which the apparatus of the embodiments is located may further include other hardware according to the actual functions of the computer device. Details are not described herein again.

Accordingly, the embodiments of the present disclosure further provide a computer readable storage medium having a computer program stored thereon, where when the program is executed by a processor, the method according to any one of the embodiments is implemented.

Accordingly, the embodiments of the present disclosure further provide a computer device, including a memory, a processor, and a computer program stored on the memory and capable of running on the processor, where when the processor executes the program, the method according to any one of the embodiments is implemented.

The present disclosure can use a form of a computer program product implemented on one or more storage media (including, but not limited to, a disk memory, a Compact Disc Read-Only Memory (CD-ROM), and an optical memory, etc.) including program codes. A computer available storage medium includes permanent and non-permanent, movable and non-movable media, and information storage can be implemented by any method or technology. Information may be a computer readable command, a data structure, a module of a program or other data. Examples of the computer storage medium include, but are not limited to, a Phase Change Random Access Memory (PRAM), a Static Random Access Memory (SRAM), a Dynamic Random Access Memory (DRAM), other types of Random Access Memories (RAMs), a Read-Only Memory (ROM), an Electrically Erasable Programmable Read-Only Memory (EE-PROM), a flash memory or other memory technologies, a CD-ROM, a Digital Video Disk (DVD) or other optical storage, and a magnetic tape cartridge. Magnetic tape disk storage or other magnetic storage devices or any other non-transmission medium can be used for storing information that can be accessed by a computing device.

After considering the specification and practicing the specification disclosed herein, a person skilled in the art would easily conceive of other implementation solutions of the present disclosure. The present disclosure aims at including any variations, uses or adaptive changes of the present disclosure. These variations, uses or adaptive changes follow the general principles of the present disclosure and include common general knowledge or common technical means in the technical field that are not disclosed in the present disclosure. The specification and embodiments are merely regarded as exemplars, and the true scope and spirit of the present disclosure are pointed out in the following claims.

It should be understood that the present disclosure is not limited to the accurate structures described above and shown in the accompanying drawings, various modifications and changes can be made without departing from the scope of the present disclosure. The scope of the present disclosure is only limited by the appended claims.

The above descriptions are merely preferred embodiments of the present disclosure and are not intended to limit the present disclosure. Any modification, equivalent replacement, or improvement made within the spirit and principle of the present disclosure shall fall within the scope of protection of the present disclosure.

The descriptions of the embodiments above tend to focus on differences between the embodiments, and for same or similar parts in the embodiments, refer to these embodiments. For the purpose of brevity, details are not described again.

The invention claimed is:

1. An image association method, comprising:
obtaining a first image and a second image, wherein the first image is obtained by capturing a scene by a first image capture device at a first view, the second image is obtained by synchronously capturing the scene by a second image capture device at a second view, and the first view is different from the second view;
determining an epipole of the first image capture device on a plane of the second image, wherein the epipole represents a position of the first image capture device on the plane of the second image;
determining a projection point of a first target point in a first bounding box on the second image, wherein the first bounding box is a bounding box of a target in the first image; and
determining an association bounding box of the first bounding box in the second image according to the epipole and the projection point, wherein a target in the association bounding box and the target in the first bounding box are the same target in the scene,
wherein determining the epipole of the first image capture device on the plane of the second image comprises:
determining each of eigenvalues of a predetermined fundamental matrix and an eigenvector corresponding to each of the eigenvalues, wherein the predetermined fundamental matrix is a transformation matrix between a pixel coordinate system of the first image and a pixel coordinate system of the second image; and
determining the epipole of the first image capture device on the plane of the second image according to the eigenvector corresponding to the minimum eigenvalue.

2. The method according to claim 1, wherein
a plurality of targets is comprised in the first image; and
determining the projection point of the first target point in the first bounding box on the second image comprises:

determining first bounding boxes corresponding to the plurality of targets in the first image, wherein each of the first bounding boxes comprises a first target point; and determining a projection point of the first target point in each of the first bounding boxes on the second image sequentially according to a position of each of the first bounding boxes in the first image from bottom to top.

3. The method according to claim 2, wherein determining the association bounding box of the first bounding box in the second image according to the epipole and the projection point comprises:

according to the position of each of the first bounding boxes in the first image from bottom to top, determining sequentially the association bounding box, in the second image, of the first bounding box corresponding to each of the projection points according to the epipole and the projection point.

4. The method according to claim 1, wherein determining the projection point of the first target point in the first bounding box on the second image comprises:

determining the projection point of the first target point on the second image according to a predetermined homography matrix, wherein the homography matrix is a transformation matrix between a common plane in the first image and the common plane in the second image, and the common plane is a plane in which the first target point is located and which appears in a field of view of the second image capture device.

5. The method according to claim 1, wherein determining the association bounding box of the first bounding box in the second image according to the epipole and the projection point comprises:

for each of second bounding boxes in the second image, determining a perpendicular foot and a distance from a second target point in the second bounding box to a straight line determined by the epipole and the projection point, wherein the second bounding box is a bounding box of a target in the second image; and a relative position relationship between the second target point in the second bounding box and the second bounding box is identical with a relative position relationship between the first target point and the first bounding box in which the first target point is located;

determining the second bounding box of the second target point with the distance within a preset range and the perpendicular foot on a line segment determined by the epipole and the projection point, as a candidate bounding box; and placing the candidate bounding box into a candidate bounding box group; and determining the association bounding box of the first bounding box in the second image from the candidate bounding box group.

6. The method according to claim 5, wherein determining the association bounding box of the first bounding box in the second image from the candidate bounding box group comprises:

determining the candidate bounding box of the second target point with the next closest distance between the perpendicular foot and the projection point, as the association bounding box.

7. An image association system, comprising:
a first image capture device, configured to obtain a first image by capturing a scene at a first view;

a second image capture device, configured to obtain a second image by synchronously capturing the scene at a second view, wherein the first view is different from the second view; and a processor, configured to:
obtain the first image and the second image;
determine an epipole of the first image capture device on a plane of the second image, wherein the epipole represents a position of the first image capture device on the plane of the second image;

determine a projection point of a first target point in a first bounding box on the second image, wherein the first bounding box is a bounding box of a target in the first image; and determine an association bounding box of the first bounding box in the second image according to the epipole and the projection point, wherein a target in the association bounding box and the target in the first bounding box are the same target in the scene, wherein determining the epipole of the first image capture device on the plane of the second image comprises:

determining each of eigenvalues of a predetermined fundamental matrix and an eigenvector corresponding to each of the eigenvalues, wherein the predetermined fundamental matrix is a transformation matrix between a pixel coordinate system of the first image and a pixel coordinate system of the second image; and determining the epipole of the first image capture device on the plane of the second image according to the eigenvector corresponding to the minimum eigenvalue.

8. A non-transitory computer readable storage medium having a computer program stored thereon, wherein when the computer program is executed by a processor, the method according to claim 1 is implemented.

9. A computer device, comprising a memory, a processor, and a computer program stored on the memory and capable of running on the processor, wherein when the processor executes the program, the processor is caused to perform operations comprising:

obtaining a first image and a second image, wherein the first image is obtained by capturing a scene by a first image capture device at a first view, the second image is obtained by synchronously capturing the scene by a second image capture device at a second view, and the first view is different from the second view;

determining an epipole of the first image capture device on a plane of the second image, wherein the epipole represents a position of the first image capture device on the plane of the second image;

determining a projection point of a first target point in a first bounding box on the second image, wherein the first bounding box is a bounding box of a target in the first image; and determining an association bounding box of the first bounding box in the second image according to the epipole and the projection point, wherein a target in the association bounding box and the target in the first bounding box are the same target in the scene, wherein determining the epipole of the first image capture device on the plane of the second image comprises:

determining each of eigenvalues of a predetermined fundamental matrix and an eigenvector corresponding to each of the eigenvalues, wherein the predetermined fundamental matrix is a transformation matrix between a pixel coordinate system of the first image and a pixel coordinate system of the second image; and determining the epipole of the first image capture device on the plane of the second image according to the eigenvector corresponding to the minimum eigenvalue.

10. The computer device according to claim 9, wherein a plurality of targets is comprised in the first image; determining the projection point of the first target point in the first bounding box on the second image comprises:

determining first bounding boxes corresponding to the plurality of targets in the first image, wherein each of the first bounding boxes comprises a first target point; and determining a projection point of the first target point in each of the first bounding boxes on the second image sequentially according to a position of each of the first bounding boxes in the first image from bottom to top.

11. The computer device according to claim 10, wherein determining the association bounding box of the first bounding box in the second image according to the epipole and the projection point comprises:

according to the position of each of the first bounding boxes in the first image from bottom to top, determining sequentially the association bounding box, in the second image, of the first bounding box corresponding to each of the projection points according to the epipole and the projection point.

12. The computer device according to claim 9, wherein determining the projection point of the first target point in the first bounding box on the second image comprises:

determining the projection point of the first target point on the second image according to a predetermined homography matrix, wherein the homography matrix is a transformation matrix between a common plane in the first image and the common plane in the second image, and the common plane is a plane in which the first target point is located and which appears in a field of view of the second image capture device.

13. The computer device according to claim 9, wherein determining the association bounding box of the first bounding box in the second image according to the epipole and the projection point comprises:

for each of second bounding boxes in the second image,
determining a perpendicular foot and a distance from a second target point in the second bounding box to a straight line determined by the epipole and the projection point, wherein the second bounding box is a bounding box of a target in the second image; and a relative position relationship between the second target point in the second bounding box and the second bounding box is identical with a relative position relationship between the first target point and the first bounding box in which the first target point is located;

determining the second bounding box of the second target point with the distance within a preset range and the perpendicular foot on a line segment determined by the epipole and the projection point, as a candidate bounding box; and placing the candidate bounding box into a candidate bounding box group; and determining the association bounding box of the first bounding box in the second image from the candidate bounding box group.

14. The computer device according to claim 13, wherein determining the association bounding box of the first bounding box in the second image from the candidate bounding box group comprises:

determining the candidate bounding box of the second target point with the next closest distance between the perpendicular foot and the projection point, as the association bounding box.

* * * * *